(12) United States Patent
Höfler

(10) Patent No.: US 7,959,220 B2
(45) Date of Patent: Jun. 14, 2011

(54) VEHICLE FOR CONVEYING PASSENGERS WITH A FIREWALL

(75) Inventor: Werner Höfler, Krefeld (DE)

(73) Assignee: Siemens Aktiengesellschaft, Munich (DE)

( * ) Notice: Subject to any disclaimer, the term of this patent is extended or adjusted under 35 U.S.C. 154(b) by 206 days.

(21) Appl. No.: 12/309,544

(22) PCT Filed: Jun. 20, 2007

(86) PCT No.: PCT/EP2007/056156
§ 371 (c)(1),
(2), (4) Date: Jan. 22, 2009

(87) PCT Pub. No.: WO2008/012148
PCT Pub. Date: Jan. 31, 2008

(65) Prior Publication Data
US 2009/0308621 A1    Dec. 17, 2009

(30) Foreign Application Priority Data

Jul. 24, 2006 (DE) .......................... 10 2006 034 676

(51) Int. Cl.
*B60N 99/00* (2006.01)
*A62C 3/07* (2006.01)
*B61D 27/00* (2006.01)

(52) U.S. Cl. .............................. 296/208; 169/48; 454/83

(58) Field of Classification Search ................... 52/232, 52/741.1; 296/190.09, 208; 428/36.5, 36.91; 169/48; 454/83
See application file for complete search history.

(56) References Cited

U.S. PATENT DOCUMENTS

| 5,399,121 A | 3/1995 | Gray et al. |
| 5,488,770 A * | 2/1996 | Yamada et al. ............... 29/897.2 |
| 6,171,533 B1 * | 1/2001 | Adams et al. ................. 264/45.2 |
| 2006/0070321 A1 * | 4/2006 | Au ................................... 52/232 |

FOREIGN PATENT DOCUMENTS

| DE | 7433396 U | 6/1975 |
| DE | 19654633 C1 | 4/1998 |
| DE | 20315537 U1 | 2/2004 |
| EP | 1060917 B1 | 12/2000 |
| EP | 1249255 A1 | 10/2002 |
| GB | 1222870 | 2/1971 |
| RU | 2278031 C1 | 6/2006 |

OTHER PUBLICATIONS

EBC-Mitteilungen 7900 01 05, "Vorbeugender Brandschutz bei Schienenfahrzeugen and Magnetschwebebahnen", Teil 5, Konstruktive Gestaltung der Fahrzeuge, erstellt durch EISENBAHN-CERT, DE, Bonn, Stand: Jun. 2001, pp. 1-8.

* cited by examiner

*Primary Examiner* — Lori L Lyjak

(57) ABSTRACT

A people carrier with an air-conditioning duct which is guided in a long stretched-out intermediate space delimited by walls is disclosed, and with at least one barrier between the air-conditioning duct and the walls, the barrier running essentially perpendicularly to the air-conditioning duct, wherein the at least one barrier is produced from a textile fireproofing material.

19 Claims, 2 Drawing Sheets

VEHICLE FOR CONVEYING PASSENGERS WITH A FIREWALL

CROSS REFERENCE TO RELATED APPLICATIONS

This application is the US National Stage of International Application No. PCT/EP2007/056156 filed Jun. 20, 2007 and claims the benefit thereof. The International Application claims the benefits of German application No. 10 2006 034 676.9 DE filed Jul. 24, 2006, both of the applications are incorporated by reference herein in their entirety.

FIELD OF INVENTION

The invention relates to a vehicle for conveying passengers, having an air conditioning duct which extends in an elongated intermediate space which is bounded by walls, and having at least one partition which runs between the air conditioning duct and the walls, essentially perpendicularly with respect to the air conditioning duct.

BACKGROUND OF INVENTION

In a rail vehicle, as an example of a vehicle for conveying passengers, it is known to make the air conditioning duct extended in an intermediate space which is bounded by an intermediate ceiling of the rail vehicle and its roof. This intermediate space runs in the longitudinal direction of the rail vehicle, as does the air conditioning duct. With respect to fire protection, the regulation EBC 7900 01 05 must be complied with, according to which regulation partitions have to be provided at regular intervals in the intermediate space in order to delay the propagation of flames and hot gases.

In order to comply with these regulations, metal partitions have previously been used to seal off the intermediate space, said metal partitions enclosing the air conditioning duct and being sealed off from the walls of the intermediate space.

SUMMARY OF INVENTION

The use of metal partitions for sealing off the intermediate space has the disadvantage that their shaping has to be adapted very precisely to the local conditions in the intermediate space.

An object of the invention is to specify a vehicle of the type mentioned at the beginning in which the partition can be adapted better to the respectively present local conditions in the intermediate space.

This object is achieved in the vehicle for conveying passengers of the type mentioned at the beginning in that the at least one partition is manufactured from a textile fireproof material.

Implementing the partition in textile form has the advantage that there is greater ease of adaptation to existing shapes of the intermediate ceiling, of the roof and in particular of the air conditioning duct. It is also necessary to bear in mind the possibility of the air conditioning duct itself being composed of textile material. In such cases, the use of a partition which is also a textile material is of particular advantage in terms of fire protection.

Ablative carbonizers and intumescent thin layer formers are favorable coating materials for the textile partition. Both groups of materials have fireproof properties. Both coating materials can be used when the textile partition is not already manufactured from fireproof material itself. In many cases, if the air conditioning duct is in a textile form, it will be composed of fireproof material and the same material will be selected for the partition. However, in cases in which the partition is composed of a material which is not suitable for fire protection, it can be "upgraded" using the two aforesaid coating materials.

The partition is preferably detachably connected to the air conditioning duct and to the walls. This simplifies the mounting of the partition, which is usually not installed until the air conditioning duct is already completely installed within the intermediate space.

The detachable connection of the partition to the air conditioning duct and to the walls ensures favorable maintenance properties. While the metal partitions used in the prior art can only be removed under very difficult circumstances once they have been installed, the textile partition can easily be removed from the intermediate space by releasing the connection to the walls and to the air conditioning duct, and can if appropriate be replaced or maintenance can be performed on it.

The partition can be connected to the air conditioning duct and to the walls by means of at least one attachment strip. In this context, the attachment strip can be embodied in particular as a strip of touch and close fastener. In this way, the desired detachable connection of the partition to the air conditioning duct and to the walls can be brought about in a particularly favorable fashion. For example, part of the attachment strip either runs around the air conditioning duct and along the walls of the intermediate space, which walls are formed in the example of a rail vehicle by its roof and its intermediate ceiling. Alternatively, it is also possible for the partition to be installed at a location on the air conditioning duct at which the air conditioning duct itself is attached to the roof and to the intermediate ceiling using suitable fasteners. In this case, the attachment strip can run from the intermediate ceiling upward along the fasteners of the air conditioning duct to the roof and from there outward until the roof meets the intermediate ceiling, and from there back to the connecting point between the air conditioning duct fastener and the intermediate ceiling.

The air conditioning duct itself can be manufactured from a textile material. In this embodiment it is possible for an attachment strip for connecting the partition to the air conditioning duct to be sewn thereto. In particular if the attachment strip is embodied as a strip of touch and close fastener it is then a component of the air conditioning duct itself.

The air conditioning duct is preferably guided between rails which run in the longitudinal direction of the vehicle and which then form the fasteners already described above.

As an alternative to the embodiment of the air conditioning duct made of textile material, it can also be manufactured from flexurally rigid material, in which case it is then likewise attached between the roof and the intermediate ceiling. An attachment strip which is provided then runs along the free outer sides of the air conditioning duct.

As an alternative to connecting the partition using the at least one attachment strip, the partition can also be riveted at least partially to the air conditioning duct and/or to the walls. Although this method of fastening is more difficult to undo for maintenance purposes, a more reliable connection is produced between the partition and the air conditioning duct or walls.

A preferred exemplary embodiment of the invention is that the vehicle is in the form of a rail vehicle, in which case the intermediate space can then run in the roof area of the rail vehicle, and the walls can be formed by a roof and an intermediate ceiling of the rail vehicle.

However, in alternative applications of the invention, air conditioning ducts which are guided in an intermediate space at any location in vehicles for conveying passengers can also be provided with the textile partitions which are described here in more detail.

BRIEF DESCRIPTION OF THE DRAWINGS

Exemplary embodiments of the invention are explained in more detail below with reference to the drawings, in which.

DETAILED DESCRIPTION OF INVENTION

Figure 1:
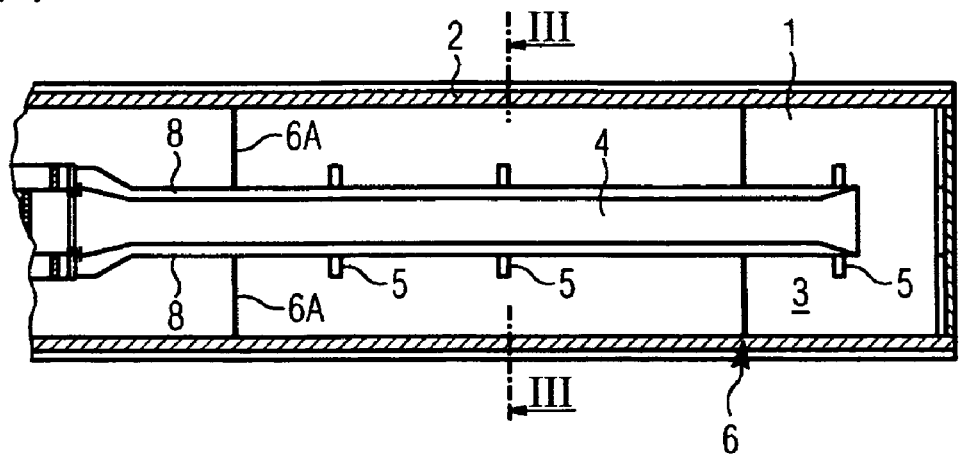
FIG. 1 is a horizontal longitudinal sectional view through a roof area of a rail vehicle.

FIG. 1 shows a longitudinal section through a roof area of a rail vehicle. An intermediate space 1 in the roof area is defined by external walls which are formed by a roof 2 itself and an intermediate ceiling 3 which is arranged above the passenger compartment. In the intermediate space 1, a textile air conditioning duct 4, which is guided in four metal rails 8 between the roof 2 and the intermediate ceiling 3, extends in the longitudinal direction of the rail vehicle.

Venting connections 5, from which fresh air can be guided into passenger spaces on the other side of the intermediate ceiling 3, start from the air conditioning duct 4.

The intermediate space 1 is divided by a total of two textile partitions 6. An individual partition 6 adjoins the air conditioning duct 4 and extends from the air conditioning duct 4 to the roof 2 and to the intermediate ceiling 3 in such a way that the intermediate space 1 is sealed at this location. In the present exemplary embodiment, the air conditioning duct 4 and the four metal rails 8, between which it extends, form a unit which extends between the intermediate ceiling 3 and the roof 2, with the result that the intermediate space 1 is divided in the transverse direction of the rail vehicle. For this reason, in the present exemplary embodiment the partition 6 is embodied in two parts, with each part being connected individually to the air conditioning duct 4, to the roof and to the intermediate ceiling 3, for sealing purposes.

The partitions 6 are suitably made of textile material and fireproof material so that they slow down or avoid the propagation of fire, smoke or noxious gases in the longitudinal direction of the rail vehicle. The partitions 6 are manufactured from the same textile fireproof material as the air conditioning duct 4. If a material which is not suitable for fire proofing has been selected for the partition 6, subsequent "upgrading" of the material using ablative carbonizers or intumescent thin layer formers which meet the necessary fire protection requirements can be carried out.

Figure 2:
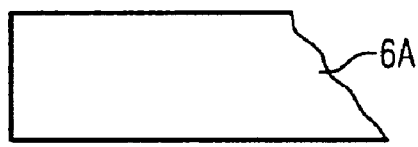
FIG. 2 is a plan view of a textile partition.

A plan view of a partial partition 6A is illustrated in FIG. 2. Before mounting, the partition can be in a rolled-in state in which it is then placed in its end position in which essentially half of the cross section of the intermediate space 1 is sealed off by the partition 6.

Figure 3:
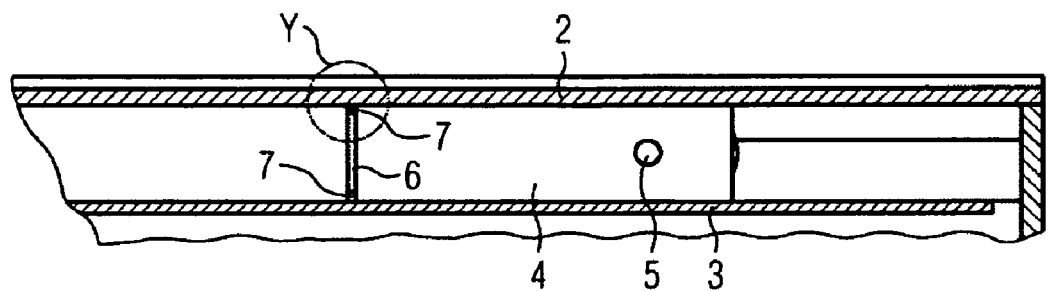
FIG. 3 is a vertical longitudinal sectional view of the roof area of a rail vehicle in FIG. 1.

FIG. 3 shows in particular the horizontal arrangement of the components described above, in particular the position of the partition 6 between the roof 2 and intermediate ceiling 3, and of the air conditioning connector 5.

Figure 4:
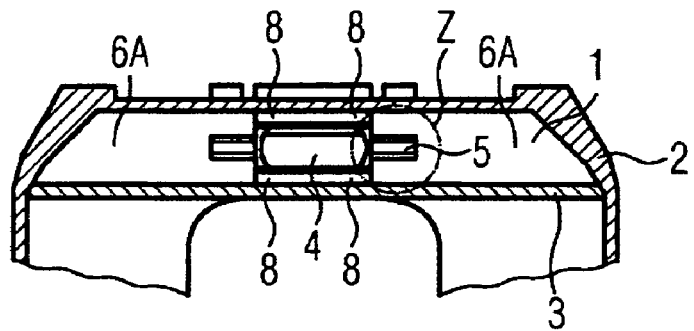
FIG. 4 is a cross sectional view of the roof area in FIG. 1.

FIG. 4 shows a cross sectional view of the roof area, wherein in particular the attachment of the air conditioning duct 4 by means of metal rails 8 to the roof 2 and to the intermediate ceiling 3 is illustrated. The metal rails 8, which extend along the rail vehicle, form planar connecting faces to the intermediate space 1. In order to attach the partial partition 6A, a strip 7 of touch and close fastener is provided with a vertical orientation on the two said faces, which strip of a touch and close fastener extends from these faces along an inner side of the roof up to a position at which the roof touches the outer edge of the intermediate ceiling 3, and from there on an upper side along the intermediate ceiling 3 as far as two metal rails 8 lying one above the other. This strip 7 of touch and close fastener serves to attach the partition 6 made of textile fireproof material in such a way that the intermediate space 1 is effectively sealed off. For reasons of simplicity of the drawing, the relevant reference symbols have been provided only on the right-hand side in FIG. 4. The same elements described above are likewise located on the left-hand side of the roof area of the rail vehicle.

Figure 5:
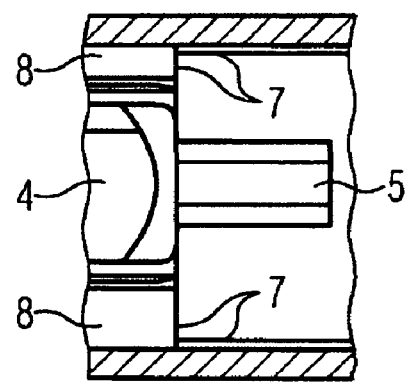
FIG. 5 is a view of a detail from FIG. 4.

Particularly the attachment area in the vicinity of the fastener 5 for the air conditioning duct 4 is illustrated in more detail in FIG. 5, which shows a detail Z from FIG. 4 in an enlarged form.

Figure 6:
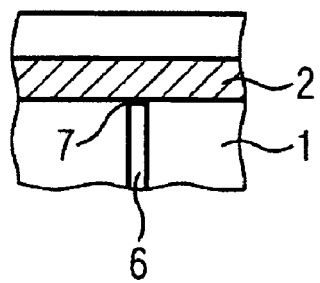
FIG. 6 is a view of a detail from FIG. 3.

FIG. 6 shows a detail Y from FIG. 3, in particular an arrangement of the strip 7 of touch and close fastener between an inner side of the roof 2 and the partition 6.

As an alternative to the formation of the air conditioning duct 4 from textile material, it can also be manufactured from flexurally rigid material. The method of functioning of the invention remains the same in such a case.

It is to be emphasized that the attachment lines, which are covered with a strip 7 of touch and close fastener in the exemplary embodiment explained above, can also have a row of rivets with which the partial partition 6A can be connected to the air conditioning duct 4, the roof 2 and the intermediate ceiling 3. To this extent, the reference symbol "7" can also be representative of a row of rivets.

The invention claimed is:

1. A vehicle for conveying passengers, comprising:
   an air conditioning duct which extends in an elongated intermediate space bounded by walls; and
   a partition which runs between the air conditioning duct and the walls, essentially perpendicularly with respect to the air conditioning duct, wherein the partition is manufactured from a textile fireproof material.

2. The vehicle as claimed in claim 1, wherein the partition is detachably connected to the air conditioning duct and to the walls.

3. The vehicle as claimed in claim 2, wherein the partition is connected to the air conditioning duct and to the walls by an attachment strip.

4. The vehicle as claimed in claim 3, wherein the attachment strip is a strip of touch and close fastener.

5. The vehicle as claimed in claim 1, wherein the air conditioning duct is manufactured from a textile material.

6. The vehicle as claimed in claim 5, wherein an attachment strip for connecting the partition to the air conditioning duct is sewn thereto.

7. The vehicle as claimed in claim 5, wherein the air conditioning duct is guided between rails which run in the longitudinal direction of the vehicle.

8. The vehicle as claimed in claim 6, wherein the air conditioning duct is guided between rails which run in the longitudinal direction of the vehicle.

9. The vehicle as claimed in claim 1, wherein the air conditioning duct is manufactured from flexurally rigid material.

10. The vehicle as claimed in claim 2, wherein the air conditioning duct is manufactured from flexurally rigid material.

11. The vehicle as claimed in claim 3, wherein the air conditioning duct is manufactured from flexurally rigid material.

12. The vehicle as claimed in claim 4, wherein the air conditioning duct is manufactured from flexurally rigid material.

13. The vehicle as claimed in claim 1, wherein the partition is riveted at least partially to the air conditioning duct and to the walls.

14. The vehicle as claimed in claim 1, wherein the partition is riveted at least partially to the air conditioning duct or to the walls.

15. The vehicle as claimed in claim 9, wherein the partition is riveted at least partially to the air conditioning duct and to the walls.

16. The vehicle as claimed in claim 9, wherein the partition is riveted at least partially to the air conditioning duct or to the walls.

17. The vehicle as claimed in claim 1, wherein the intermediate space runs in the roof area of a rail vehicle, and the walls are formed by a roof and an intermediate ceiling of the rail vehicle.

18. The vehicle as claimed in claim 1, wherein the partition has a fireproof coating.

19. The vehicle as claimed in claim 18, wherein the coating is formed by an ablative carbonizer or an intumescent thin layer former.

* * * * *